United States Patent [19]

Wilson

[11] Patent Number: 4,726,174
[45] Date of Patent: Feb. 23, 1988

[54] CANINE FILTRATION MASK

[76] Inventor: Margaret N. Wilson, 2651 Sacramento St., Berkeley, Calif. 94702

[21] Appl. No.: 901,577

[22] Filed: Aug. 29, 1986

[51] Int. Cl.⁴ ............................. B68C 5/00; A62B 7/00
[52] U.S. Cl. ..................................... 54/80; 128/207.11
[58] Field of Search ............... 119/129, 130, 131, 132, 119/142; 2/9, 206, 424; 54/80, 81; 132/88.5; 128/206.12, 206.28, 207.11

[56] References Cited

U.S. PATENT DOCUMENTS

| | | | |
|---|---|---|---|
| 888,687 | 5/1908 | Boggs | 54/80 |
| 2,407,029 | 9/1946 | Miller | 54/80 |
| 3,104,508 | 9/1963 | O'Hare, Jr. | 54/81 |
| 3,491,755 | 1/1970 | Barghini et al. | 54/80 X |

Primary Examiner—Robert P. Swiatek
Attorney, Agent, or Firm—Douglas E. White

[57] ABSTRACT

A dog filtration mask including a crown band having first and second ends; air filtration paper or cloth attached to the first end of the crown band; and a collar attached to the second end of the crown band.

9 Claims, 2 Drawing Figures

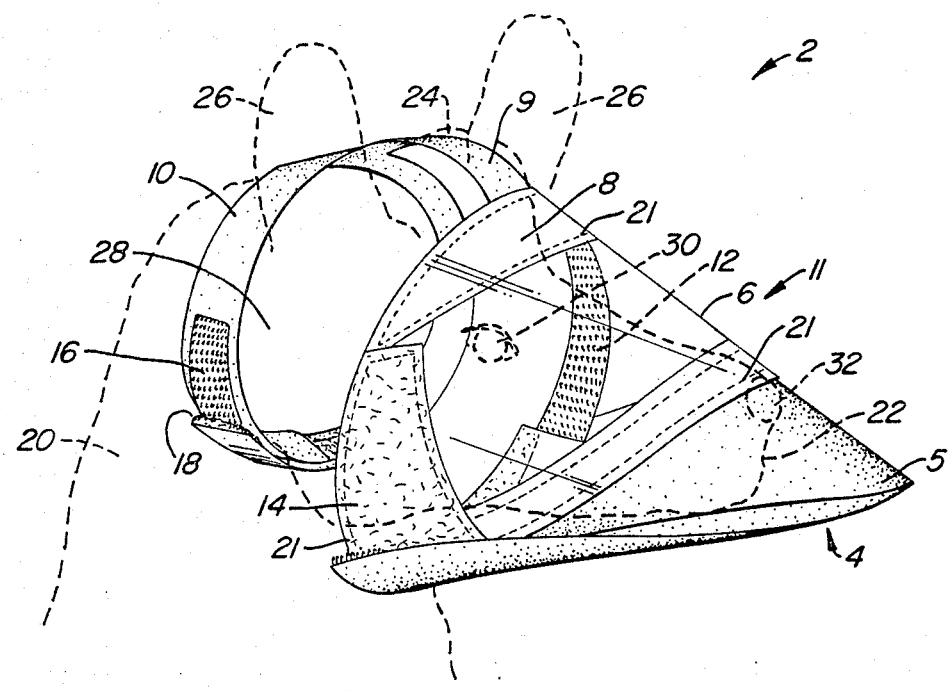
FIG._1.
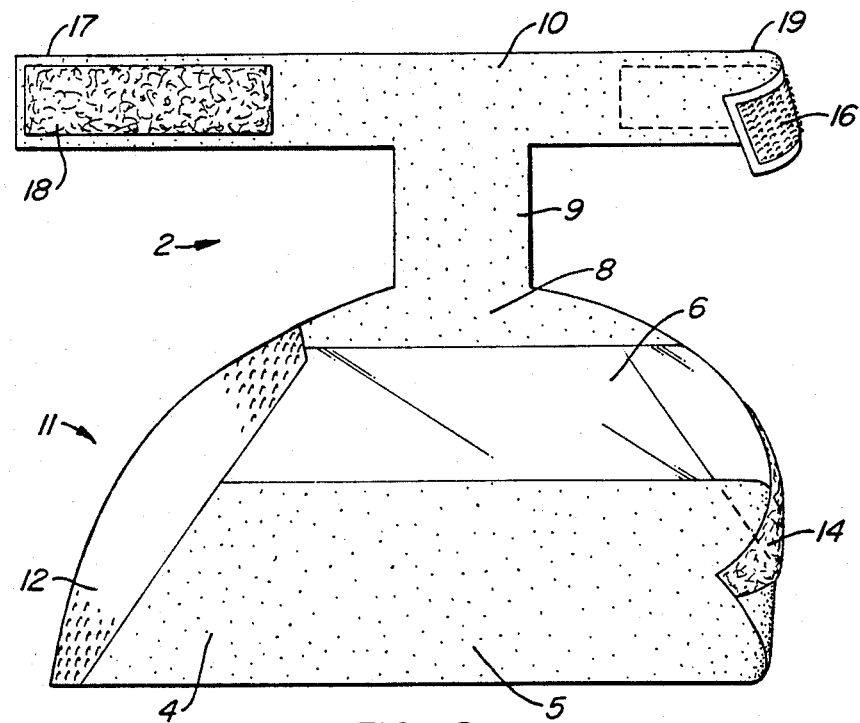
FIG._2.

CANINE FILTRATION MASK

FIELD OF THE INVENTION

This invention relates to air filtration masks, more particularly to a mask for grooming dogs with chalk, which mask includes filtration means and a transparent visor.

BACKGROUND OF THE INVENTION

Show dogs, particularly terriers, are prepared for exhibition and judging by, among others things, dusting the coat of the dog with chalk powder. First the dog's legs are wetted with water and VASELINE brand lubricant is put on the legs. The furnishings of the legs are then dusted with chalk to highlight their appearance. This process may take up to one-half hour and can be discomfiting to the dog. The dust may irritate the dog's eyes. This irritation not only causes watering and possibly reddening of the eyes, which conditions are unsightly in a show dog, but could conceivably cause the dog injury. In addition, the dust can enter the dog's lungs, which also can cause irritation and possible injury. Lastly, because this process can be upsetting to the dog, it can affect the dog's demeanor during exhibition.

Show dogs of this type are very valuable—they can sell for thousands of dollars. Furthermore, the dogs' owners are very emotionally attached to their pets and do not wish to cause them discomfort.

For this reason, there has been a need for means to protect terriers from the chalk dust which is used during the grooming process.

U.S. Pat. Nos. 3,918,238 to P. Iozzio and 3,742,679 to C. Jordan both teach protective wear for dogs. However, neither protects either the eyes or the nose of the dog and are thus unsuitable for use in the field of the present invention.

SUMMARY OF THE INVENTION

The present invention is a canine grooming mask which protects show dogs from the harmful effects of grooming chalk on their eyes and lungs. The mask utilizes filter paper or other filtration means to keep the chalk dust out of the dog's lungs while allowing the dog to breathe comfortably and naturally. A plastic visor protects the dog's eyes. The visor is transparent so that the dog can still see while being groomed. This is important for keeping the dog calm during what is otherwise a disturbing process.

The mask of the present invention utilizes a band which passes over the top of the dog's head between its ears to connect the body of the mask to a collar for the dog's neck. Because the crown band passes between the ears, the mask cannot rotate out of position.

Although different sizes of mask can be made for different classes of dogs, a particular mask can be adjusted to fit a particular dog by the use of a unique process. A planar filtration panel can be curved into a cone of varying shapes and sizes as dictated by the shape of the muzzle of the dog. Hook and loop fastening strips allow for adjustable fastening of the sides of the panel to retain the proper conical shape.

FEATURES AND ADVANTAGES

An object of this invention is to provide a dog grooming mask which filters the air the dog breathes while being groomed.

It is another object of this invention to both protect the dog's eyes and allow the dog to continue to see during the grooming process.

Yet another object is to provide a mask which is capable of remaining in place during the time of grooming without undue readjustment by the groomer.

To achieve the above and other objects of the invention, there is proposed, in accordance with a preferred embodiment thereof, a mask with a crown band to which is attached air filtration means and a collar for the dog's neck.

In accordance with a feature of the invention the collar is attached perpendicular to the crown band in order that the crown band may pass over the top of the head and still allow the collar to pass around the dog's neck.

In further accordance with the invention, the filtration means is filter paper formed in a flat panel. A transparent plastic visor panel is attached to the filter paper panel for shielding the eyes.

In accordance with another feature of the invention, adjustable attachment means are provided on the two sides of the paper panel which allow that panel to be curved into the shape of a cone and fastened in that position for covering the muzzle. Adjustable attachment means are also provided for securing the ends of the collar together.

Both attachment means referred to above may may consist of interlocking hook and loop strips, commonly sold under the trademark VELCRO.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 1 is a perspective view of the mask of the present invention showing a dog, in phantom, wearing the mask; and FIG. 2 is a front view of the mask of FIG. 1 in an open position.

DESCRIPTION OF THE PREFERRED EMBODIMENT

Referring initially to FIG. 2, there is shown therein a preferred canine grooming mask, generally designated as 2. Mask 2, prior to use, is flat; that is, all its components lie parallel to the plane of the drawing, with the exception of the corner containing a portion of strip 14 which is shown upturned for purposes of illustration only.

Mask 2 comprises five main components: muzzle panel 4; transparent visor 6; brow portion 8 (components 4,6,8 comprising the body 11 of the mask); crown band 9; and collar 10. Muzzle panel 4 is preferably made of filter paper through which air may freely pass but which traps chalk dust and similar particulate contaminants. Panel 4 could also be made of cloth or other material with suitable filtering properties.

Panel 4 is attached to a visor 6, the latter of which is made of a flexible transparent plastic which is impervious to dust. Visor 6, in turn, attaches to a transitional brow portion 8 for securing the body 11 of the mask 2 to crown band 9.

Crown band 9 connects body 11 to a neck collar 10. Parts 8,9,10, in the preferred embodiment are all made of the same filter paper as muzzle panel 4 in order to reduce expense and simplify manufacture. However, parts 8,9,10 could be made of more durable material, such as leather, if a non-disposable mask were desired.

For securing the mask 2 in place on a subject dog, hook and loop means are provided. Hook and loop strips are commonly available and are sold under the trademark VELCRO. The sides of the body 11 of mask 2 are secured in place by body hook strip 12 which attaches to body loop strip 14 when the muzzle panel 4 is bent over upon itself in the shape of a cone.

The ends of collar 10 are fastened together by collar hook strip 16 which attaches to collar loop strip 18 when the collar is looped around the neck of a dog.

Turning to FIG. 1, the mask 2 of FIG. 2 is shown fastened in place on the head of a subject dog 20 (in phantom). Stitching 21, which is used to hold the components of the mask 2 together, is shown in portions of FIG. 1, but is omitted from FIG. 2 for clarity.

Panel 4 is turned in upon itself over muzzle 22 of dog 20 and hook strip 12 is pressed in place upon the portion of loop strip 14 which it overlaps (greater or lesser portions of strips 12,14 overlap depending on the size of the dog's muzzle 22). Body 11 is adjusted in place over muzzle 22 such that nostril portion 5 of panel 4 covers the dog's nostrils 32 and transparent panel 6 covers the dog's eyes 30. The body 11 forms a cone when the panel 4 is rolled in this manner. In an alternate embodiment (not illustrated), a protruding flap, preferably rectangular in shape, can be added to portion 5 so that an aperture, which might otherwise open up at the end of the cone when the mask is used on dogs with wide muzzles, can be closed.

Band 9 is passed up over the crown 24 of the dog's head so that it is situated between, and is held in place by, ears 26. The ends 17,19 of collar 10 are then looped over themselves so that hook strip 16 may be pressed in place on loop strip 18, fastening the collar 10 to the dog's neck 28. Through the use of mask 2 in this manner, the dog 20 may see and breathe in comfort while being groomed.

While the above provides a full and complete disclosure of the preferred embodiments of this invention, various modifications, alternate constructions, and equivalents may be employed without departing from the true spirit and scope of the invention. For example, panel 4 could be made replaceable by the addition of separate hook and loop attachment means for securing it to the body 11 instead of stitches 21. Therefore, the above description and illustrations should not be construed as limiting the scope of the invention which is defined by the appended claims.

I claim:
1. A canine grooming mask including:
   a crown band having first and second ends;
   a planar, flexible, filter paper panel attached to the first end of the crown band;
   a collar attached to the second end of the crown band;
   a planar, flexible, plastic, transparent visor between the filter paper panel and the crown band and attached to the filter paper panel with the plane of the visor in the same plane as the plane of the filter paper panel;
   first and second sides of the filter paper panel; and
   first attachment means for securing the first side of the filter paper panel to the second side of the filter paper panel when the plane of the filter paper plane is turned over upon itself to form a cone.
2. The mask of claim 1 further including: second attachment means for securing a first end of collar to a second end of the collar.
3. The mask of claim 2 wherein: the first attachment means is a hook strip on the first side of the filter paper panel and a loop strip on the second side of the filter paper panel.
4. The mask of claim 3 wherein: the second attachment means is a hook strip on the first end of the collar and a loop strip on the second end of the collar.
5. A canine grooming mask including:
   a crown band having first and second ends;
   a planar and flexible panel of filter paper attached to the first end of the crown band;
   a collar attached to the second end of the crown band;
   a planar, flexible, plastic, transparent visor attached to the filter paper panel between the panel and the crown band with the plane of the visor in the same plane as the plane of the filter paper panel;
   first and second sides of the filter paper panel; and
   first attachment means for securing the first side of the filter paper panel to the second side of the filter paper panel.
6. The mask of claim 5 further including: second attachment means for securing a first end of collar to a second end of the collar.
7. The mask of claim 6 wherein: the first attachment means is a hook strip on the first side of the filter paper panel and a loop strip on the second side of the filter paper panel.
8. The mask of claim 7 wherein: the second attachment means is a hook strip on the first end of the collar and a loop strip on the second end of the collar.
9. The mask of claim 8 wherein: the collar and the crown band are made of leather.

* * * * *